United States Patent [19]

Harbison et al.

[11] 4,014,066
[45] Mar. 29, 1977

[54] LOCKING LEVER FOR PLASTIC LINK

[75] Inventors: William H. Harbison, Valparaiso; John J. Plisky, Munster, both of Ind.

[73] Assignee: The Anderson Company, Gary, Ind.

[22] Filed: Mar. 31, 1976

[21] Appl. No.: 672,252

[52] U.S. Cl. .............................................. 15/250.42
[51] Int. Cl.$^2$ ............................................ B60S 1/04
[58] Field of Search .................... 15/250.32–250.42

[56] References Cited

UNITED STATES PATENTS

| 3,405,421 | 10/1968 | Tomlin | 15/250.42 |
| 3,879,792 | 4/1975 | Brummer et al. | 15/250.42 |
| 3,935,612 | 2/1976 | Wittwer | 15/250.42 |

FOREIGN PATENTS OR APPLICATIONS 1,930,638   1/1970   Germany .................... 15/250.42

Primary Examiner—Peter Feldman
Attorney, Agent, or Firm—Wegner, Stellman, McCord, Wiles & Wood

[57] ABSTRACT

A lock for maintaining the pivotal connection between two parts of a pressure-distributing superstructure in a windshield wiper blade assembly in which the pivotal connection is effected by providing a pair of outwardly projecting lugs on the resilient side walls of one of the parts which nest in a pair of aligned openings in the U-shaped end portion of the other of the parts. The parts are assembled by deflecting the side walls of the one part inwardly into an open space in the one part to permit the U-shaped end portions of the other part to be fitted over the lugs. Thereafter, the resiliency of the side walls urges the lugs outwardly into the openings to pivotally connect the two parts. In order to prevent disconnection of the two parts, the lock is inserted into the open space to prevent the side walls of the one part from collapsing into the open space. The lock has enlarged portions to retain the lock within the open space which has been adapted to receive the lock. The enlarged portions of the lock have been formed to provide camming surfaces which facilitate insertion and removal of the lock into and from the open space. The lock is also pivotally connected within the open space to permit the lock to swing between an operative position preventing disconnection of the two parts and an inoperative position permitting disconnection of the two parts.

10 Claims, 8 Drawing Figures

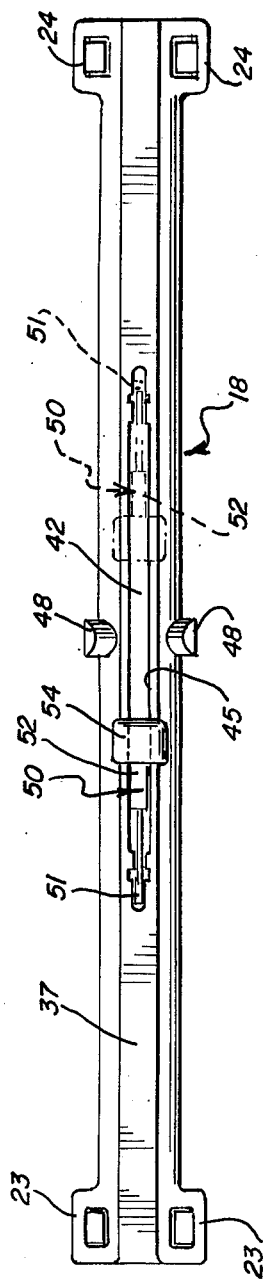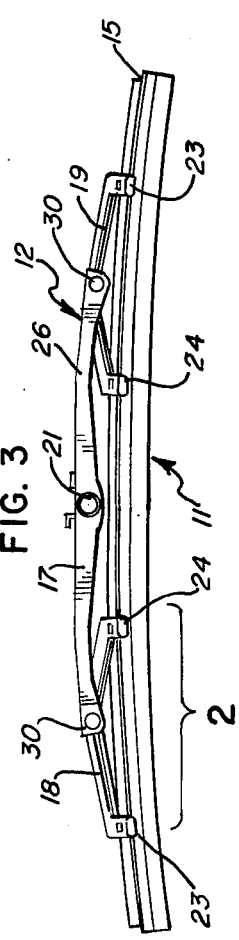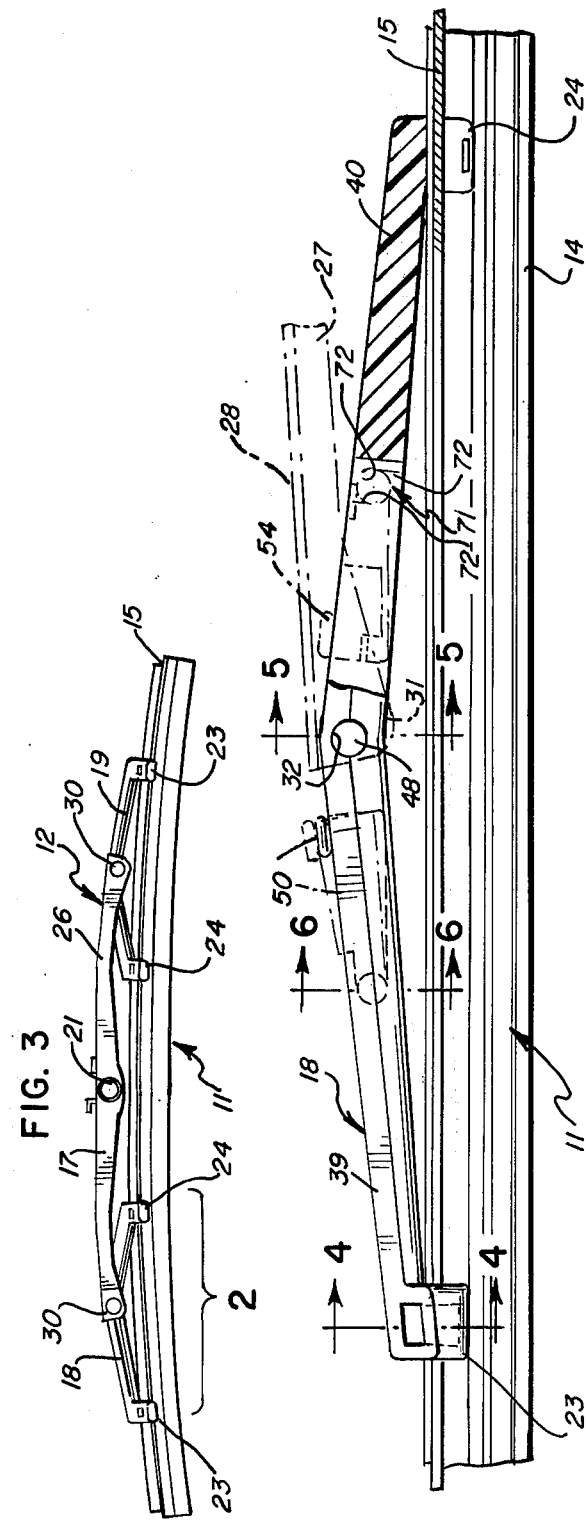
FIG. 1
FIG. 3
FIG. 2

LOCKING LEVER FOR PLASTIC LINK

BACKGROUND OF THE INVENTION

1. Field of the Invention

This invention relates to an improved windshield wiper blade assembly and, more particularly, to an improved connection between the primary yoke and the secondary yokes.

2. Description of the Prior Art

Articulated windshield wiper blades for wiping curved and flat windshields were introduced and first disclosed in Anderson U.S. Pat. No. 2,596,063 entitled "Windshield Wiper Blade Linkage Assembly," issued May 6, 1952. The present invention primarily concerns a windshield wiper blade assembly of the articulated type shown and described in Wittwer U.S. Pat. No. 3,935,612 entitled "Windshield Wiper Blade," issued Feb. 3, 1976, and assigned to the assignee of the present invention.

The windshield wiper blade assembly shown in the Wittwer patent includes a pressure-distributing superstructure operatively connected with a resilient wiper blade. The superstructure has a primary yoke and a pair of resilient secondary yokes which, in turn, support the wiper blade. Each secondary yoke is positioned within a U-shaped channel defined by a pair of spaced apart side walls at the ends of the primary yoke. The side walls of the primary yoke have a pair of aligned openings. The midportion of the secondary yoke has a vertical open space defined by a pair of spaced apart side walls. Outwardly projecting lugs carried by the side walls of the secondary yoke align with and pivotally seat in the aligned openings in the side walls of the primary yoke to provide an articulated connection between the primary yoke and the secondary yoke. The vertical open space in the resilient secondary yoke permits the lugs to deflect inwardly as the primary yoke is urged past the lugs and outwardly into connective relationship when the lugs move into the aligned openings.

When an extreme load is placed upon a wiper blade assembly of this type, it is conceivable that pressure exerted by the primary yoke on the secondary yoke may itself cause the side walls of the secondary yoke to accidentally collapse into the open space thereby permitting the lugs to be released from the aligned openings of the primary yoke. As a result, the connection between the primary yoke and the secondary yoke is broken. Such loads might be encountered when the wiper blade is frozen to the windshield and the primary yoke is forcefully moved against the resistance of the immovable secondary yoke. In any event, this type of accidental or unintentional disconnection is undesirable during the operation of the windshield wiper mechanism.

SUMMARY OF THE INVENTION

The present invention provides a windshield wiper blade assembly of the type described in which the primary and secondary yokes are easily connected, but will not accidentally or unintentionally become disconnected. A relatively simple and inexpensive mechanism has been incorporated into the assembly to affirmatively "lock" the primary and secondary yokes together.

In accordance with the invention, a lock or filler block is provided and is positioned within the vertical open space to prevent the side walls of the secondary yoke from deflecting or collapsing into the vertical open space. Hence, the lugs are maintained with a predetermined minimum spacing which prevents them from becoming unseated within the aligned openings of the primary yoke.

In an exemplary embodiment, the lock has an enlarged top portion and an enlarged bottom portion. When the lock is operatively positioned within the open space, the enlarged portions prevent the lock from "falling" out of operative position. When appropriate force is applied, the enlarged bottom portion of the lock deflects the side walls apart to permit the lock to be moved into and out of the open space, thereby permitting connection and disconnection of the primary yoke and the secondary yoke as desired. The bottom portion of the lock is provided with camming surfaces to facilitate insertion and removal of the enlarged bottom portion of the lock.

In a preferred embodiment, the lock is pivotally connected to the secondary yoke so that the lock may be moved or swung into and out of operative position without removing the lock entirely from the secondary yoke. Hence, the probability that the lock will be misplaced when the primary and secondary yokes are disengaged is lessened.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a top view of a secondary yoke of a windshield wiper blade assembly incorporating the lock of our invention;

FIG. 2 is an elevational view of the secondary yoke of FIG. 1 showing the connection between the primary and secondary yokes with parts in section and parts broken away;

FIG. 3 is a reduced elevational view of a complete windshield wiper blade assembly showing the relationship between the primary yoke and the secondary yokes of the type shown in FIGS. 1 and 2;

DESCRIPTION OF THE PREFERRED EMBODIMENT

Figure 4:
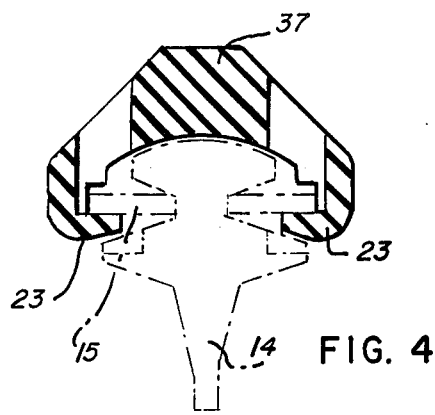
FIG. 4 is an enlarged cross-sectional view of the secondary yoke taken along line 4—4 of FIG. 2 showing the wiper blade in phantom.
Figure 5:
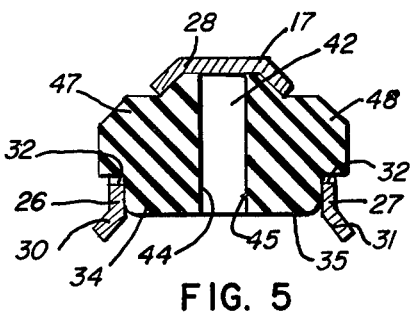
FIG. 5 is an enlarged cross-sectional view of the secondary yoke taken along line 5—5 of FIG. 2.
Figure 7:
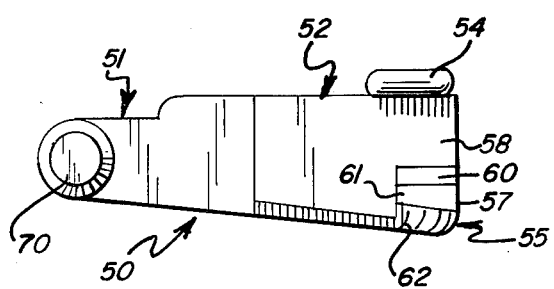
FIG. 7 is an enlarged elevational view of the lock employed in FIGS. 1 and 2.
Figure 6:
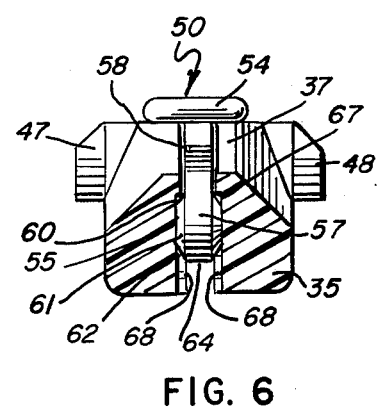
FIG. 6 is an enlarged cross-sectional view taken along line 6—6 of FIG. 2 showing the lock positioned within the open space of the secondary yoke.
Figure 8:
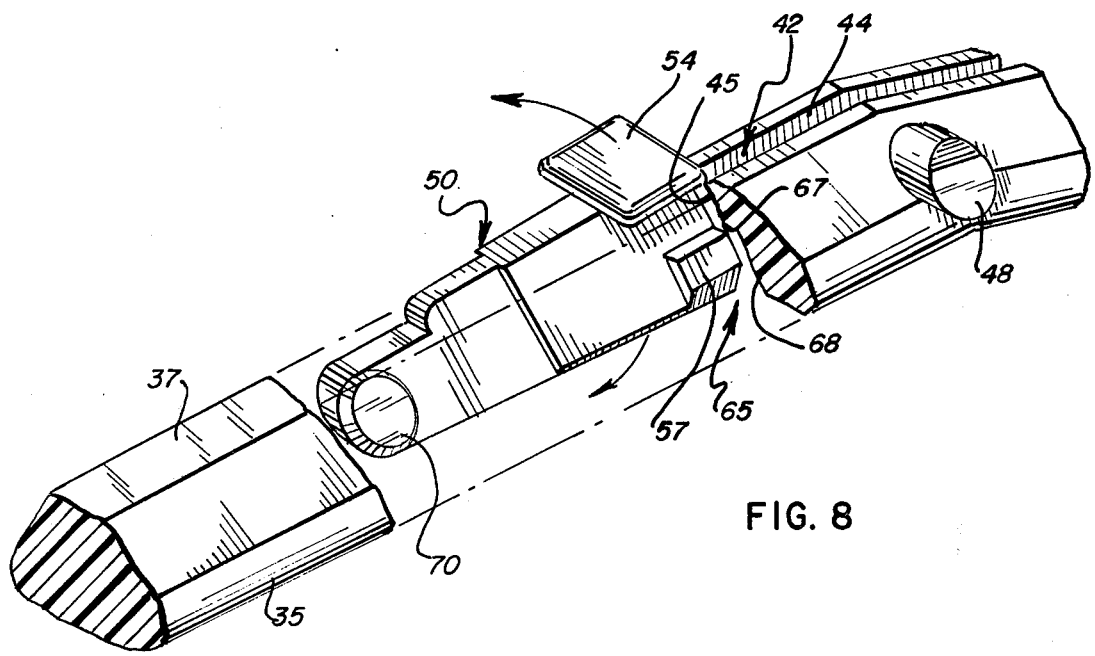
FIG. 8 is a perspective view with parts broken away showing the lock in relation to the midportion of the secondary yoke.

Referring to FIGS. 1 through 5, the windshield wiper blade assembly 10, to which the invention generally pertains, is seen to comprise a wiper blade 11 and a pressure-distributing superstructure 12. The wiper blade 11 includes a resilient rubber-like wiping element 14 connected with an elongate flexible backing strip or flexor 15. The flexor 15 is flexible in a plane perpendicular to a windshield and is substantially inflexible in a plane parallel to the windshield. The pressure-distributing superstructure 12 preferably includes a primary yoke 17 having its ends pivotally connected with the intermediate midportions of the secondary yokes 18 and 19 and has a connector 21 located intermediate the ends thereof. The windshield wiper blade assembly 10 is connected by connector 21 to a windshield wiper arm (not shown). The wiper arm, and with it the wiper blade, is moved back and forth across the surface of a windshield which is to be wiped. The secondary yokes 18 and 19 are slidably connected with the flexor 15 of the wiper blade 11 with outboard claws 23 and inboard claws 24. The claws 23 and 24 slidably engage with the flexor 15, with the outboard claws 23 engaging the flexor 15 either at or near the outer ends of the wiper blade 11.

The primary yoke 17 is shown made of metal, or of a similar substantially rigid material, and is channel-shaped in cross section so as to resemble an inverted "U" having side walls 26 and 27 and a base wall 28. Formed in the outer end portions 30 and 31 of each of the side walls 26 and 27, respectively, are aligned openings 32.

The secondary yokes 18 and 19 are molded plastic members and are adapted to have their midportions fitted between the side walls 26 and 27 of the outer end portions 30 and 31 of the primary yoke 17. The secondary yokes 18 and 19 each have side walls 34 and 35 which are joined together by a V-shaped or crowned top wall 37. Each of the secondary yokes 18 and 19 has a pair of legs 39 and 40 extending from the midportion with the leg 39 having a pair of claws 23 at its outer end portion and with the leg 40 having a pair of claws 24 at its outer end portion. The midportion of each of the secondary yokes 18 and 19 has a vertical open space 42 which is defined by side wall surfaces 44 and 45. The side wall surfaces 44 and 45 are spaced apart an amount sufficient to permit the side walls 34 and 35 of the secondary yoke to be deflected inwardly into the open space 42 a limited extent. Spaced a short distance down from the top wall 37 of each of the secondary yokes 18 and 19 and projecting outwardly from the side walls 34 and 35 of the midportion thereof are lugs 47 and 48, respectively.

To assemble the primary yoke 17 with one of the secondary yokes 18 or 19, the end portions 30 and 31 of the primary yoke 17 are substantially aligned with the lugs 47 and 48 on the secondary yoke 18 or 19 with the openings 32 somewhat aligned with the lugs 47 and 48. The midportion of the secondary yoke 18 or 19 is deflected inwardly to substantially close the open space 42 therebetween in the vicinity of the lugs 47 and 48. The side walls 26 and 27 of the primary yoke 17 may then be moved over the lugs 47 and 48 until the lugs 47 and 48 align with and seat in the openings 32 in the side walls 26 and 27 of the end portions 30 and 31 of the primary yoke 17. The resiliency of the side walls 34 and 35 of the secondary yoke 18 or 19 forces the lugs 47 and 48 outward into the aligned openings 32 so that a snug but easily maneuverable and pivotal connection between the primary yoke 17 and the secondary yoke 18 or 19 is accomplished.

In the event it is desired to separate the primary yoke 17 from the secondary yokes 18 or 19, the open space 42 is of a dimension such that the walls 34 and 35 at the midportion of the secondary yoke 18 or 19 may be deflected to close the open space 42 so that the lugs 47 and 48 can be drawn out of the openings 32 thereby disconnecting the primary yoke 17 from the secondary yokes 18 and 19. A more detailed description of the above-described assembly may be found in U.S. Pat. No. 3,935,612 noted above.

To prevent the secondary yoke 18 or 19 from being accidentally compressed and being released from the primary yoke 17, one or two filler blocks or locks 50, which may be formed from molded plastic, are incorporated into the assembly to occupy and fill the open space or gap 42 between the side walls 34 and 35 thereby preventing deflection of the side walls 34 and 35 and maintaining the lugs 47 and 48 seated in the openings 32.

The lock 50 is comprised of a rearward mounting portion 51 and a forward filler portion 52. The mounting portion 51 pivotally connects the lock 50 to the secondary yoke 18 or 19 at a point spaced from the lugs 47 and 48 permitting the lock 50 to swing or pivot between an operative position and an inoperative position. Whenever the lock 50 is pivotally moved in its operative position, the filler portion 52 lies within the open space 42 to prevent substantial inward deflection of the side walls 34 and 35. Whenever the lock 50 is pivotally moved to its inoperative position where the lock 50 is generally upright relative to the secondary yoke 18 or 19, the filler portion 52 lies outside the open space 42 to permit substantial inward deflection of the side walls 34 and 35 into the open space 42 and allow disassembly of the blade for refilling.

In order to retain the lock 50 in operative position, the forward filler portion 52 includes an enlarged, rectangular top portion or pad 54, a bottom portion 55 having a pair of laterally projecting tabs 57, and a central constricted portion or neck 58. The neck 58 is substantially the same width as the open space 42 and extends between and integrally joins the pad 54 and the bottom portion 55. The neck 58 may be formed of any width which would prevent collapse of the side walls 34 and 35 to an extent which would permit disconnection between the primary yoke 17 and the secondary yoke 18 or 19. The pad 54 and the bottom portion 55 have a width greater than the open space 42. Each of the tabs 57 has a top edge 60 tapered outwardly from the neck 58 to a side surface 61 and a bottom edge 62 tapered inwardly toward the bottom surface 64 of the lock 50.

Each of the side walls 34 and 35 has an undercut slot 65 defined by an upper wall 67 and a lateral wall 68 which provides an increased width in the vertical open space 42 to provide a seat for the tabs 57. When the lock 50 is positioned in the open space 42, the top edge 60 of the tabs 57 abuts the upper wall 67 so that the lock 50 is retained in operative position. The tapered top edges 60 permit the lock 50 to cam the side walls 34 and 35 outwardly when pressure is applied to the pad 54 to pull the pad 54 upward and pivot the lock 50 to its inoperative position. The tapered bottom edges 62 permit the lock 50 to cam the side walls 34 and 35 outwardly when pressure is applied to the pad 54 to push the pad 54 downward and pivot the lock 50 to its operative position. The enlarged pad 54 prevents the lock 50 from being pushed entirely through the open space 42. As a result of action of the pad 54 and tabs 57, the neck 58 is maintained in desired operative position within the open space 42 between the side walls 34 and 35.

The filler portion 52 is disposed in its operative position near enough to the lugs 47 and 48 to prevent collapse of the side walls 34 and 35 to an extent which would permit disconnection with the primary yoke 17, but far enough away so that the side walls 26 and 27 of the primary yoke 17 do not prevent the side walls 34 and 35 of the secondary yoke 18 or 19 from deflecting outwardly to permit swinging of the bottom portion 55 of the filler portion 52 out from the open space 42 to its inoperative position. Similarly, the mounting portion 51 of the lock 50 is remote from the lugs 47 and 48 at a distance which will permit collapse of the side walls 34 and 35 to allow removal of the lugs 47 and 48 when the lock 50 is pivoted to its inoperative position, even though the mounting portion 51 remains disposed within the open space 42. When the lock 50 is in its operative position, the filler portion 52 lies intermediate the lugs 47 and 48 and the more remote mounting portion 51.

A pair of outwardly projecting ears 70 are formed onto the mounting portion 51. Each of the ears 70 is journaled in respective recessed pockets 71 formed in the side walls 34 and 35 of the secondary yoke 18 or 19. As seen in FIG. 2, the recessed pockets 71 have a plurality of shoulders 72 which surround and operatively abut the ears 70 of the lock 50 to mount the lock 50 within the open space 42. However, the resiliency of the side walls 34 and 35 permit easy connection of the lock 50 to the secondary yoke 18 or 19. The rearward mounting portion 51 has a narrower width than the constricted neck 58 of the forward filler portion 52. The narrow width of the mounting portion 51 permits facile movement of the lock 50 between the shoulders 72 and side wall surfaces 44 and 45 without binding.

To connect the lock 50, the mounting portion 51 of the lock 50 is inserted from the top of the open space 42 at the midportion of the secondary yoke 18 or 19. The open space 42 has a width generally equal to that of the ears 70 to permit this maneuver. With the pads 54 and the tabs 57 reposed above the secondary yoke 18 or 19 and the ears 70 below, the lock 50 is slid over the area of recessed pockets 71, and the mounting portion 51 of the lock 50 is urged upward so that the ears 70 are journaled in the recessed pockets 71 with the filler portion 52 of the lock 50 at least partially extending from the top of the open space 42. Thereafter, the wiper blade yokes may be assembled and the lock 50 pivotally moved to its operative position.

We claim:

1. In a wiper assembly having a wiper blade, a pressure-distributing superstructure operatively connected with the wiper blade, the superstructure having a primary yoke and at least one secondary yoke, and means for pivotally connecting the primary yoke to the secondary yoke including spaced apart side walls on at least one end portion of the primary yoke, a pair of aligned openings in the side walls of the end portions, a midportion of the secondary yoke having a vertical open space between spaced apart side walls permitting deflection of the side walls of the secondary yoke inwardly into the vertical open space, and outwardly projecting lugs carried by the side walls of the secondary yoke, the lugs aligning with and pivotally seating in the openings in the side walls of the primary yoke, the improvement comprising a lock having a top portion, a bottom portion, and a constricted portion extending between and integrally joining said top and bottom portions, said top portion and said bottom portion having widths greater than the width of the vertical open space, the vertical open space having along a lower portion an undercut slot, said undercut slot having a width substantially the same width as said bottom portion of said lock, said lock being inserted into the vertical open space position said bottom portion of said lock into said undercut slot of the vertical open space and said top portion of said lock over the vertical open space to maintain said lock in operative position, said lock, when operatively positioned with said constricted portion of said lock disposed within the vertical open space between the side walls of the secondary yoke, preventing substantial deflection of the side walls of the secondary yoke inwardly into the vertical open space thereby maintaining the pivotal connection between the primary yoke and the secondary yoke.

2. The wiper assembly of claim 1 wherein said lock has a front portion and a rear portion, said front portion forming said top, bottom and constricted portions, said rear portion having a pair of outwardly projecting ears for pivotally mounting said lock within the vertical open space, the side walls of the vertical open space having recessed pockets opening to the vertical open space and being disposed in each of the side walls of the secondary yoke in aligned relation with said ears to journal said ears and thereby pivotally connect said lock with the secondary yoke.

3. The wiper assembly of claim 1 wherein said bottom portion has top edges tapering outwardly from said constricted portion and bottom edges tapering inwardly toward the bottom of said lock, said bottom edges engaging the side walls of the secondary yoke such that relative pressure forcing said lock into the vertical open space cams the side walls outwardly from the vertical open space to permit said bottom portion to be inserted into the vertical open space and seated in said undercut slot of the vertical open space, said top edges engaging the side walls of the secondary yoke such that relative pressure forcing said lock from the vertical open space cams the side walls outwardly from the vertical open space to permit said bottom portion to be removed from the vertical open space and said undercut slot.

4. In a wiper assembly having a wiper blade, a pressure-distributing superstructure operatively connected with the wiper blade, the superstructure having a primary yoke and at least one secondary yoke, and means for pivotally connecting the primary yoke to the secondary yoke including spaced apart side walls on at least one end portion of the primary yoke, a pair of aligned openings in the side walls of the end portions, a midportion of the secondary yoke having a vertical open space between spaced apart side walls permitting deflection of the side walls of the secondary yoke inwardly into the vertical open space, and outwardly projecting lugs carried by the side walls of the secondary yoke, the lugs aligning with and pivotally seating in the openings in the side walls of the primary yoke, the improvement comprising a lock having a mounting portion and a filler portion, said mounting portion being pivotally connected to the secondary yoke at a point spaced from the lugs for swinging movement of said lock between an operative position and an inoperative position, said filler portion being positioned within the vertical open space whenever said lock is moved to its operative position to substantially occupy the vertical open space and fill the gap between the side walls of the secondary yoke to prevent substantial deflection of the side walls into the vertical open space and thereby maintain the lugs seated in the openings in the primary yoke, and said filler portion being spaced from the vertical open space whenever said lock is moved to its inoperative position to permit substantial deflection of the side walls of the secondary yoke into the vertical open space and thereby permit the release of the lugs from the openings in the primary yoke.

5. In a wiper assembly having a wiper blade, a pressure-distributing superstructure operatively connected with the wiper blade, the superstructure having a primary yoke and at least one secondary yoke, and means for pivotally connecting the primary yoke to the secondary yoke including spaced apart side walls on at least one end portion of the primary yoke, a pair of aligned openings in the side walls of the end portions, a midportion of the secondary yoke having a vertical open space between spaced apart side walls permitting deflection of the side walls of the secondary yoke inwardly into the vertical open space, and outwardly projecting lugs carried by the side walls of the secondary yoke, the lugs aligning with and pivotally seating in the openings in the side walls of the primary yoke, the improvement comprising a lock having a top portion, a bottom portion, and a constricted portion extending between and integrally joining said top and bottom portions, the vertical open space being adapted to receive said lock therein with said constricted portion operatively positioned within the vertical open space between the side walls of the secondary yoke, said top and bottom portions of said lock both having a greater width than the vertical oepn space thereby retaining said constricted portion of said lock within the vertical open space to prevent substantial deflection of the side walls of the secondary yoke inwardly into the vertical open space and maintain the pivot connection between the primary yoke and the secondary yoke.

6. In a wiper assembly having a wiper blade, a pressure-distributing superstructure operatively connected with the wiper blade, and means for pivotally connecting at least two parts of the superstructure together including a pair of spaced apart walls on at least one end portion of the first of the parts, a pair of aligned openings in the walls of the end portions, a midportion of the second of the parts having a vertical open space between a pair of spaced apart walls permitting deflection of the walls of the second part inwardly into the vertical open space, and outwardly projecting lugs carried by the walls of the second part, the lugs aligning with and pivotally seating in the openings of the first part, the improvement comprising a lock having a mounting portion and a filler portion, said mounting portion being pivotally connected to the second part at a point spaced from the lugs for swinging movement of said lock between an operative position and an inoperative position, said filler portion being positioned within the vertical open space whenever said lock is moved to its operative position to substantially occupy the vertical open space and fill the gap between the walls of the second part to prevent substantial deflection of the walls of the second part into the vertical open space and thereby maintain the lugs seated in the openings in the first part, and said filler portion being spaced from the vertical open space whenever said lock is moved to its inoperative position to permit substantial deflection of the walls of the second part into the vertical open space and thereby permit the release of the lugs from the openings in the first part.

7. In a wiper assembly having a wiper blade, a pressure-distributing superstructure operatively connected with the wiper blade, and means for pivotally connecting at least two parts of the superstructure together including a pair of spaced apart walls on at least one end portion of the first of the parts, a pair of aligned openings in the walls of the end portions, a midportion of the second of the parts having a vertical open space between a pair of spaced apart walls permitting deflection of the walls of the second part inwardly into the vertical open space, and outwardly projecting lugs carried by the walls of the second part, the lugs aligning with and pivotally seating in the openings of the first part, the improvement comprising a lock having a top portion, a bottom portion, and a constricted portion extending between and integrally joining said top and bottom portions, said top portion and said bottom portion having widths greater than the width of the vertical open space, the vertical open space having along a lower portion an undercut slot, said undercut slot having a width substantially the same as said bottom portion of said lock, said lock being inserted into the vertical open space to position said bottom portion of said lock into said undercut slot of the vertical open space and said top portion of said lock over the vertical open space to maintain said lock in operative position, said lock, when operatively positioned with said constricted portion of said lock disposed within the vertical open space between the walls of the second part, preventing deflection of the walls of the second part inwardly into the vertical open space thereby maintaining the pivotal connection between the first part and the second part.

8. In a wiper assembly having a wiper blade, a pressure-distributing superstructure operatively connected with the wiper blade, and means for pivotally connecting at least two parts of the superstructure together, a portion of one of the parts having a vertical open space between a pair of spaced apart walls permitting deflection of the walls of the said part inwardly into the vertical open space during assembly and disassembly of two of the parts of the superstructure, in combination with a lock having a mounting portion and a locking portion, said lock having said mounting portion pivotally positioned in a remote portion of said vertical open space to position said locking portion within the vertical open space between the walls of the second part to prevent deflection of the walls of the second part inwardly into the vertical open space.

9. In a pressure-distributing superstructure for a wiper blade having a least two parts pivotally connected together, one of said parts having a pair of spaced apart walls on at least one end portion, the second of said parts having a vertical open space between a pair of spaced apart walls permitting deflection of the walls of the second part inwardly into the vertical open space, said pivotal connection being effected between the said spaced apart walls of the first and second parts, in combination with a lock having a mounting portion and a locking portion, said mounting portion of said lock being pivotally mounted in a remote portion of said vertical open space to position said locking portion within the vertical open space between the walls of the second part preventing deflection of the walls of the second part inwardly into the vertical open space and thereby maintaining the pivotal connection between the first part and the second part.

10. In a wiper assembly having a wiper blade, a pressure-distributing superstructure operatively connected with the wiper blade, and means for pivotally connecting at least two parts of the superstructure together including a pair of spaced apart walls on at least one end portion of the first of the parts, a pair of aligned openings in the walls of the end portions, a portion of the second of the parts having a vertical open space between a pair of spaced apart walls permitting deflection of the walls of the second part inwardly into the vertical open space, and outwardly projecting lugs carried by the walls of the second part, the lugs aligning with and pivotally seating in the openings of the first part, the improvement comprising a lock having a mounting portion and a filler portion, said mounting portion securing said lock within the vertical open space of the second part, said filler portion being positioned within the vertical open space whenever said lock is moved to its operative position to substantially occupy the vertical open space and fill the gap between the walls of the second part to prevent substantial deflection of the walls of the second part into the vertical open space and thereby maintain the lugs seated in the openings in the first part.

* * * * *

UNITED STATES PATENT AND TRADEMARK OFFICE
CERTIFICATE OF CORRECTION

PATENT NO. : 4,014,066
DATED : March 29, 1977
INVENTOR(S) : William H. Harbison & John J. Plisky It is certified that error appears in the above-identified patent and that said Letters Patent are hereby corrected as shown below:

Column 6, line 5, after "space" insert --to--.

Column 7, line 32, change "oepn" to read --open--.

Signed and Sealed this

Thirty-first Day of May 1977

[SEAL]

Attest:

RUTH C. MASON
Attesting Officer

C. MARSHALL DANN
Commissioner of Patents and Trademarks